（12） United States Patent
Tyagi et al.

(10) Patent No.: US 9,412,082 B2
(45) Date of Patent: Aug. 9, 2016

(54) METHOD AND SYSTEM FOR DEMAND RESPONSE MANAGEMENT IN A NETWORK

(75) Inventors: Rajesh Tyagi, Niskayuna, NY (US); Jason Wayne Black, Clifton Park, NY (US); John Andrew Ellis, Clifton Park, NY (US); Bex George Thomas, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 637 days.

(21) Appl. No.: 12/646,012

(22) Filed: Dec. 23, 2009

(65) Prior Publication Data

US 2011/0153102 A1  Jun. 23, 2011

(51) Int. Cl.
G06Q 10/00 (2012.01)
G06Q 10/06 (2012.01)
G06Q 10/04 (2012.01)
H02J 3/14 (2006.01)
H02J 3/00 (2006.01)

(52) U.S. Cl.
CPC .......... *G06Q 10/06312* (2013.01); *G06Q 10/04* (2013.01); *G06Q 10/06313* (2013.01); *G06Q 10/06315* (2013.01); *H02J 3/14* (2013.01); *H02J 2003/007* (2013.01); *Y02E 60/76* (2013.01); *Y04S 10/54* (2013.01); *Y04S 40/22* (2013.01)

(58) Field of Classification Search
None
See application file for complete search history.

(56) References Cited

U.S. PATENT DOCUMENTS

| | | | |
|---|---|---|---|
| 6,868,293 B1 | 3/2005 | Schurr et al. | |
| 7,305,281 B2 | 12/2007 | Scott et al. | |
| 7,359,878 B2 | 4/2008 | Peljto et al. | |
| 2002/0007388 A1 | 1/2002 | Bannai et al. | |
| 2002/0019758 A1 | 2/2002 | Scarpelli | |
| 2002/0032644 A1* | 3/2002 | Corby et al. | 705/37 |
| 2004/0215529 A1 | 10/2004 | Foster et al. | |
| 2004/0215545 A1* | 10/2004 | Murakami et al. | 705/36 |
| 2009/0254225 A1 | 10/2009 | Boucher et al. | |

FOREIGN PATENT DOCUMENTS

| | | | |
|---|---|---|---|
| JP | 2002135976 A | 5/2002 | |
| JP | 2006074952 A | 3/2006 | |

OTHER PUBLICATIONS

Ericson Torgeir, Hosehold self-election of a dynamic electricity tariff, Discussion Papers 446, Statistics Norway Research Department, 2006.*

Hull John C, Options, Futures and Other Derivatives 6th Edition, ISBN 0121499084,2006.*

(Continued)

*Primary Examiner* — Octavian Rotaru
(74) *Attorney, Agent, or Firm* — Nitin N. Joshi

(57) ABSTRACT

A method and system for controlling demand events in a utility network with multiple customer sites. The value of a demand response parameter threshold for invoking a demand response event is calculated based on the number of available demand response events and the number of opportunities remaining to issue the available demand response events. This parameter represents the utility objectives for using the demand response program (e.g., cost savings, reliability, avoided costs). A current value of the demand response parameter is compared to the threshold value, and a determination is made whether or not to call a demand response event for the current opportunity, or to save the event for a future opportunity based upon this comparison.

5 Claims, 3 Drawing Sheets

(56) References Cited

OTHER PUBLICATIONS

Definition of a Normal distribution function as an exemplary Probability Distribution function http://math.elon.edu/statistics112/norm_dist.html.*

D. B. Rosenfield et al., "Optimal Strategies for Selling an Asset," Management Science, vol. 29, No. 9, Sep. 1983, pp. 1051-1061.

P.R. Freeman, "The Secretary Problem and its Extensions: A Review," International Statistical Review, vol. 51, 1983, pp. 189-206.

R. H. Hayes, "Optimal Strategies for Divestiture," Operations Research, vol. 17, No. 2, Mar.-Apr. 1969, pp. 292-310.

R. Kleinberg, "A Multiple-Choice Secretary Algorithm with Applications to Online Auctions," Proceedings of the 16th Annual ACM-SIAM Symposium on Discrete Algorithms, 2005, pp. 630-631.

Journal of the European Patent office, vol. 30, No. 11, Nov. 2007, pp. 592-593.

European Search Report and Written Opinion From corresponding Application No. EP10194765, mailed on Mar. 30, 2011.

Unofficial English translation of Office Action issued in connection with corresponding JP Application No. 2010-279973 on Aug. 5, 2014.

* cited by examiner

METHOD AND SYSTEM FOR DEMAND RESPONSE MANAGEMENT IN A NETWORK

BACKGROUND

Demand response refers to mechanisms used to encourage/induce utility consumers to curtail or shift their demand at particular times in order to reduce aggregate utility demand. For example, electric utilities employ demand response solutions to reduce peak demand for electricity. Demand response programs typically offer customers incentives for agreeing to reduce their demand at certain times. Many of these programs stipulate that the utilities can invoke a limited number of demand response/curtailment (e.g., critical peak pricing) events in a given time period (e.g., 20 per year). Therefore, utilities would like to invoke curtailment events only on those occasions when utility demand and generation costs are among the highest. However, for various reasons including weather, utility demand cannot be forecasted with certainty, especially for long time periods into the future. While short-term (e.g. within 24 hours) demand may be known within reasonable bounds, longer-term demand (e.g., weeks or longer) can at best be estimated as a probability distribution.

To date, utilities typically use simple heuristic based triggers, such as temperature or reserve margin, to determine when to invoke a demand response or curtailment event. However, this approach does not provide the utilities with the best opportunity to exercise the option of economic load shedding or curtailment so that their gains, savings, and/or other criteria are optimized.

For these and other reasons, there is a need for the present invention.

SUMMARY

A method and system for controlling demand events in a utility network with multiple customer sites. The value of a demand response parameter threshold for invoking a demand response event is calculated based on the number of available demand response events and the number of opportunities remaining to issue the available demand response events. This parameter represents the utility objectives for using the demand response program (e.g., cost savings, reliability, avoided costs). A current value of the demand response parameter is compared to the threshold value, and a determination is made whether or not to call a demand response event for the current opportunity, or to save the event for a future opportunity based upon this comparison.

BRIEF DESCRIPTION OF THE DRAWINGS

The nature and various additional features of the invention will appear more fully upon consideration of the illustrative embodiments of the invention which are schematically set forth in the figures. Like reference numerals represent corresponding parts.

Figure 1:
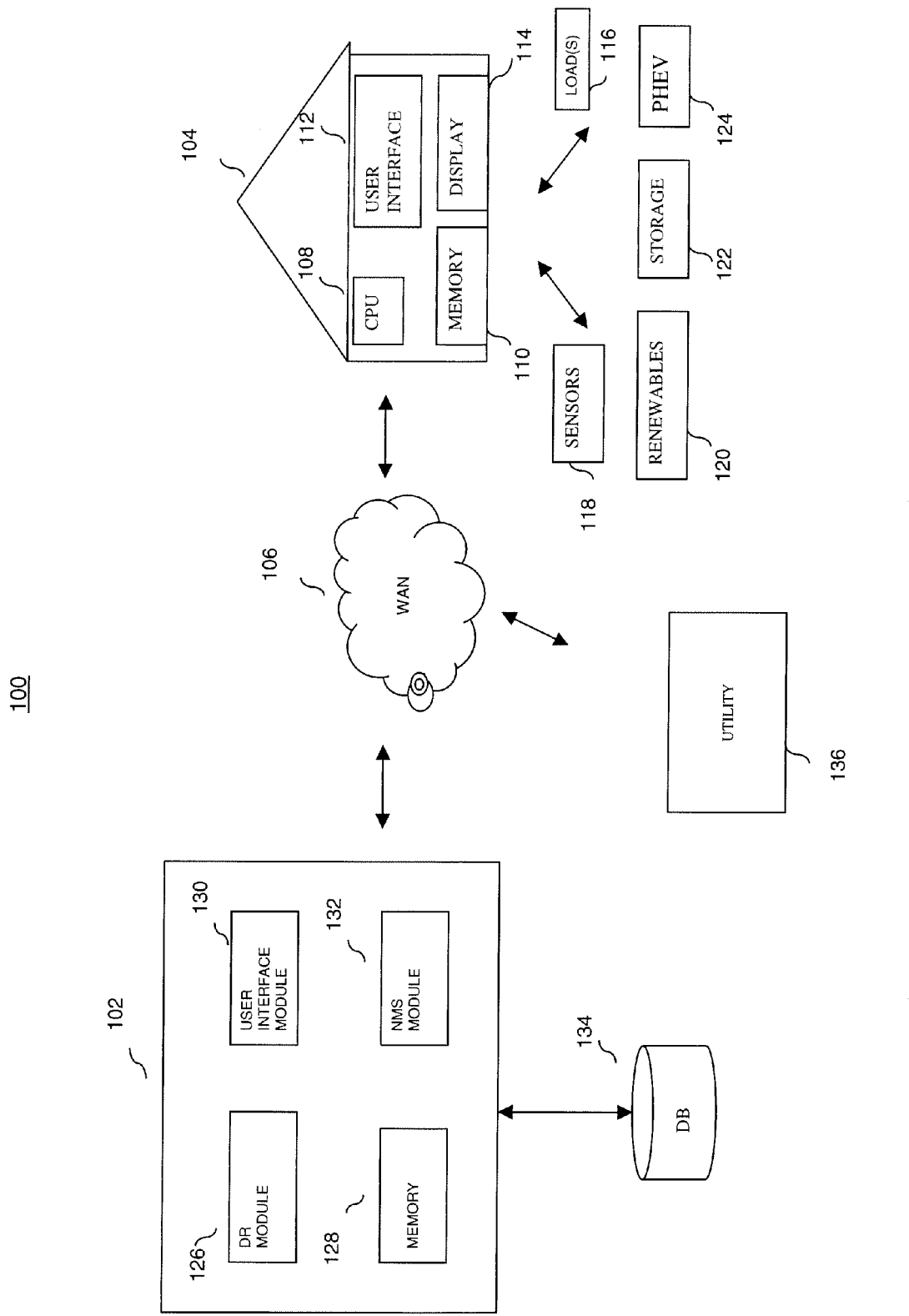
FIG. 1 illustrates a utility management system according to an embodiment of the invention.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein are directed to an energy management method and system that enable utilities to optimize the use of demand response or curtailment events during certain periods of time. While embodiments of the invention will be described in the context of energy or electric utilities, it will be appreciated by those skilled in the art that the method and system can be used for other purposes or utilities as well.

As used herein, the term "module" refers to software, hardware, or firmware, or any combination of these, or any system, process, or functionality that performs or facilitates the processes described herein.

Load curtailment or demand response according to embodiments of the invention allows utilities to determine when a curtailment or critical peak pricing event should be called. According to embodiments of the invention, utilities (or other load servicing entities or demand aggregators) make the decision on whether to invoke a demand response event by first defining an objective which maximizes their benefit/value for using demand response. They then identify a value parameter, which is based on future values such as demand, market prices, temperature, etc. that determine the value parameter. By considering probability distributions of the variables that compose the value parameter for each opportunity in the future, the value of the parameter used to establish the decision criteria for invoking events can be calculated such that the utility should invoke a curtailment event only if the value of using the event exceeds the expected future value of the event if it is not used for the current opportunity. The decision takes into account the number of curtailments or demand responses available to the utility through its customers, the number of opportunities (e.g., days or the amount of time available, etc.) for calling a demand response event, and calculates an update threshold amount for the value parameter after each opportunity, based on the new values of available events and number of opportunities, and probability distributions of the variables that compose the value parameter for each opportunity in the future.

Embodiments of the invention include values for $d_{mn}$, the threshold value for the decision criteria with m events remaining over n opportunities. These values can be arranged in a lookup table that can be used to determine whether to initiate a demand response event for any given scenario. The criteria could be savings, highest temperature, or any other suitable criteria for the utility. If today's value is better than the decision criteria, then an event should be called. Otherwise, the opportunity should be saved for another time.

An exemplary energy management system according to an embodiment of the invention is shown in FIG. 1. The system 100 includes an energy management server 102, a customer site 104, and a utility 136. In order to facilitate the description of the embodiments of the invention, a single server 102, a single utility customer 104, and a single utility source 136 are shown in FIG. 1. However, it should be understood that embodiments of the invention are not limited to these numbers, and that there can be any number of energy management servers, customer sites, and control centers in a utility network. In addition, the energy management server 102 can be arranged at and/or hosted by the utility 136 or by any other party.

Each customer site includes a processor 108, a memory 110, a user interface 112, and a display 114. The user interface 112 can include a keyboard or touch screen, for example. The processor 108 runs programs for monitoring and controlling the operation of various customer devices such as loads 116, sensors 118, renewables 120, storage 122, and plug in electric vehicles (PEV) or plug in hybrid electric vehicles (PHEV) 124. The sensors 118 include meters, thermostats, occupancy sensors, humidity gauges, and other suitable devices. The renewable resources 120 can include solar and/or wind power devices, for example. The processor 108 controls the various components using any of a number of interfaces or protocols including Zigbee, Z-Wave, or Homeplug, for example. Communication between the customer site 104, the server 102, and the utility 136 occurs via a WAN (e.g., Internet) 106, WiMAX, broadband, AMI, and/or power line carriers, for example. Communication can also occur via a private network. Any suitable means for communication can be used.

The energy management server 102 includes a demand response (DR) module 126, a memory 128, a user interface module 130, a network management module (NMS) 132, and a database (DB) 134. The network management module 132 provides communication management and provisioning for the DR module 126, the customer site 104 and the utility 136. The database 134 stores data such as historical data for each customer site in the network. The historical data can include information on customer utility usage including load type, time of use (TOU), duration of use, shed or demand response events, for example. The customer usage information stored in the database 134 can be updated periodically (e.g., hourly, daily) with load data including hourly load and hourly price over a twenty four hour period, environmental data including weather information (temperature, humidity, wind speed, heating and cooling degrees) and date and time information such as day of the week, season, etc. In addition, the database 134 stores event data for each customer site. More specifically, the database 134 stores historical information on whether a customer site participated in a demand response event, the start time and end time, day of week, season, etc. The user interface module 130 provides information to an operator.

The DR module 126 utilizes information from the customer site 102 and the utility 136 to determine whether to call a demand response event to reduce load on the network. According to embodiments of the present invention, the DR module 126 calculates at least one threshold or decision criteria based on the number of available demand response events and available opportunities. The utility utilizes this threshold to optimize the use of demand response events by determining whether or not to call a demand response event. The demand response event is either directly controlled by the utility through switching, automatically controlled by the utility via commands sent to the customer sites, or implemented by customers at the customer sites. More particularly, demand response can be implemented by direct or indirect load control such that utilities can either remotely switch off the devices agreed upon by contract (e.g., HVAC units, wherein HVAC is an abbreviation for heating, ventilation and air conditioning), or send a load control signal to the customer site 104. A home energy management system run on the processor 108 can then determine which devices to curtail in order to meet the utility requirement/request.

Embodiments of the invention allow utilities to determine whether or not to invoke a demand response event (option) at each opportunity by updating the threshold or decision criteria (e.g. strike price, temperature, etc.) for each opportunity (in this example, period of time) based on the number of remaining events, the system conditions for the current opportunity (e.g., price, reserve margin, demand, etc.), the number of remaining opportunities, and the forecast for the system conditions (including uncertainty ranges) over the remaining opportunities. There are only a given number of opportunities available to take the actions (e.g., the DR events). During each opportunity, a value parameter is computed that represents the benefit from calling an event. The value parameter can represent cost, revenue, savings or any such measure. Embodiments of the invention determine when to take the action such that the value parameter is optimized. Embodiments of the invention apply to demand response and to other aspects of energy management including deciding when to charge/discharge a battery storage system to support renewable (e.g., wind or solar) power generators, for example.

According to an exemplary embodiment of the invention, the DR module 126 determines on which days, over a given time horizon, a power utility should exercise the option of economic load shedding so that its savings are maximized. In this example, the savings are a function of the cost of generating power, and higher cost implies higher load shed savings. The determination is equivalent to picking the days when the generation costs will be highest. Alternatively, daily generation costs can be replaced by savings that would be realized if an economic load shedding or demand response event were exercised on that day. Given a planning horizon of a certain number of days, the utility forecasts daily generation costs over the planning horizon. As each day materializes, an actual daily cost is incurred. This cost is derived from that day's generation cost. The utility must decide if that day's daily cost is high enough to exercise one of the available load shedding options. If the option is exercised, certain savings are realized and one less option is available in the future. If the option is not exercised, the number of options available remains the same. Regardless of whether the option is exercised or not, the number of opportunities remaining to exercise the options shrinks by one and the following day presents the next such opportunity.

Generally, in the exemplary embodiments, a threshold option value is developed for each day in the planning horizon, and this value represents the optimal expected savings from having the ability to exercise an option to call the shedding option that day. As each day is encountered, the actual savings for that day is measured against the threshold value. If the savings is higher than the expected savings, the shedding option should be exercised. Otherwise, if the savings is lower than the threshold, the option should be deferred and the decision point moves to the next day, which will have its own threshold that reflects the optimal expected savings for the remaining options and planning period. Details of computing the daily thresholds are discussed below.

An example for calculating the decision criteria or threshold and total expected value of events are given in the context of savings in generation cost if peak pricing events were to be called. However, it is to be understood that other criteria can be used.

Computing Daily Thresholds for Multi Events (or Actions) Problem:

Define $C_n$=estimated saving in period n; $C_n$ follows a probability distribution.

Define $E(C_n)$=expected value of $C_n$.

Define $P(C_n > x)$=Probability that $C_n > x$

Define $V_{mn}$=total expected savings with m actions allowed over n periods.
Define $D_{mn}$=decision criteria for opportunity n with m actions available.
Consider m=1 actions:
From existing literature, it is known that expected savings from the single action is maximized when:

$$V_{11}=E(C_1)$$

$$D_{11}=0$$

$$D_{1n}=V_{1,n-1}$$

$$V_{1n}=P(C_n>V_{1,n-1})*E(C_n|C_n>V_{1,n-1})+[1-P(C_n>V_{1,n-1})]*V_{1,n-1}$$

$V_{1,n}$ can be calculated analytically for some well defined distributions; otherwise Monte Carlo simulation techniques can be used for its estimation.
For m=2 or more actions, the policy can be developed as follows:
Case n<=m:
When n<=m, an action must be exercised in each period as deferring an action results in losing the opportunity to use that action; therefore, in this case, the decision criteria in each such period is set to 0. Further, since an action will be taken in each period, the savings in each period will be the expected value of the cost function. Thus, $$D_{mn} = 0 \text{ for } n = 1, 2, \ldots, m.$$

$$\text{and } V_{mn} = \sum_{k=1}^{n} E(C_k) = V_{m,n-1} + E(C_n) \text{ for } n = 1, 2, \ldots, m$$

For n>m:
Estimate the breakeven point for taking or not taking an action for a current opportunity. If action is not taken (i.e., it is deferred), then there are m actions available over remaining (n−1) opportunities. So the total expected savings if we defer=$V_{m,n-1}$. If, on the other hand, an action is taken for the current opportunity, a savings of $V_{m-1,n-1}$ can be expected from the remaining actions. Thus, the break-even point for the action is the difference between the two, and represents the decision criteria for the current opportunity:

$$D_{mn}=V_{m,n-1}-V_{m-1,n-1}$$

The total expected savings will be:

$$V_{mn}=C_n+V_{m-1,n-1} \text{ if } C_n>D_{mn}(=V_{m,n-1}-V_{m-1,n-1}), \text{ and}$$
$$V_{mn}=V_{m,n-1}$$

otherwise.

$$V_{mn}=P(C_n>V_{m,n-1}-V_{m-1,n-1})*[E(C_n|C_n>V_{m,n-1}-V_{m-1,n-1})+V_{m-1,n-1}]+[1-P(C_n>V_{m,n-1}-V_{m-1,n-1})]*V_{m,n-1}$$

$V_{mn}$ can be calculated analytically for some well defined distributions; otherwise Monte Carlo simulation techniques can be used for its estimation.

Once $D_{mn}$ have been estimated, the utility policy is generated. More particularly, a look-up table is generated, as shown in Table 1. In this exemplary embodiment, it is assumed that there are 3 demand response events available over a planning horizon of 5 days, with the savings on each day following a uniform distribution over the range [90,110]. The simulation approach is applied to estimate $V_{mn}$, which are used to calculate $D_{mn}$.

TABLE 1

Decision Values Lookup Table

| # of Events | Number of Opportunities | | | | |
|---|---|---|---|---|---|
| | 5 | 4 | 3 | 2 | 1 |
| 1 | 104.8 | 103.9 | 102.5 | 100.0 | 0.0 |
| 2 | 101.7 | 99.9 | 97.5 | 0.0 | 0.0 |
| 3 | 98.4 | 96.2 | 0.0 | 0.0 | 0.0 |

Starting with 5 opportunities available, the utility can follow the policy as follows. If the projected savings are greater than 98.4 ($D_{35}$), then a demand response event should be exercised to realize savings; and at the next opportunity, the decision criteria to call another demand response event becomes 99.9 ($D_{24}$). If on the other hand, projected savings with 5 opportunities available are not greater than 98.4 ($D_{35}$), a demand response event is not exercised and at the next opportunity, the decision criteria to call another demand response event becomes 96.2 ($D_{34}$). Either way, the decision criteria continues to be updated using the lookup table until all events are exercised.

Figure 2:
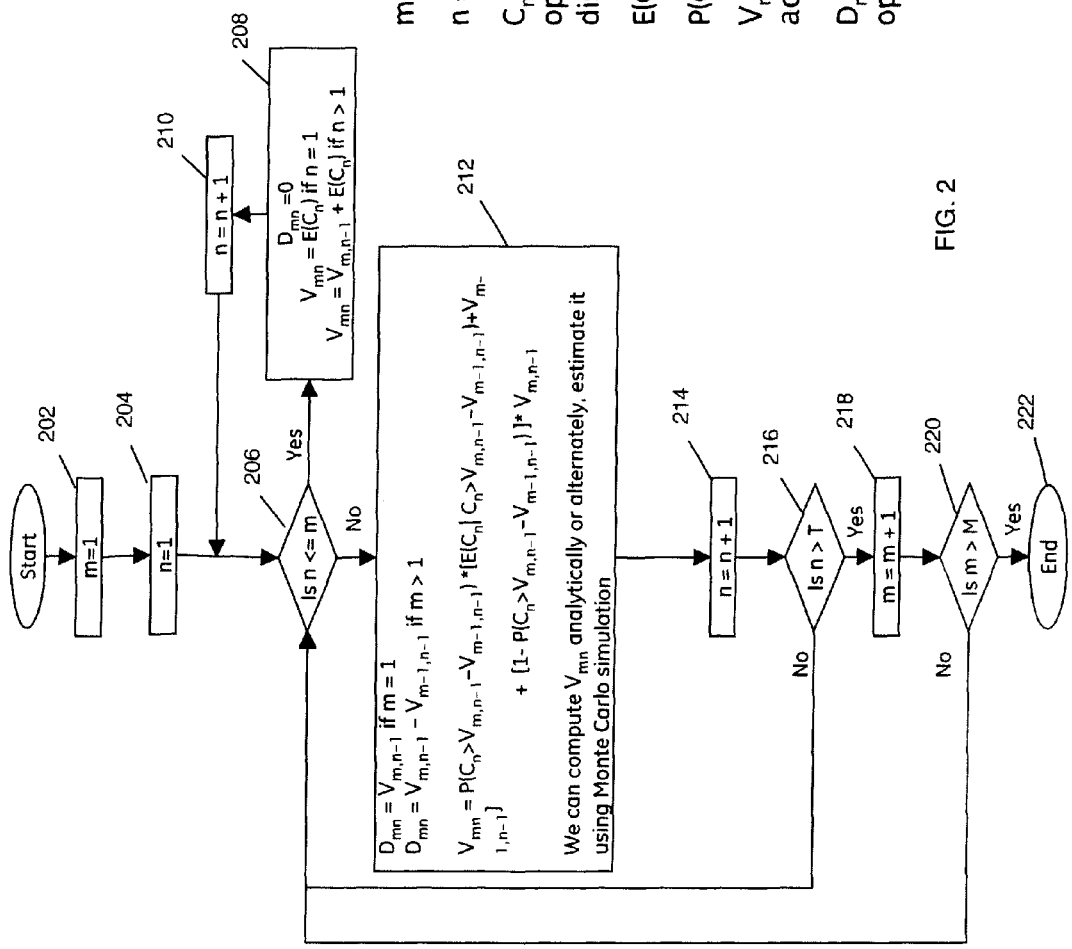
FIG. 2 illustrates a flow diagram of a threshold generation process associated with the system depicted in FIG. 1, according to an embodiment of the invention.

FIG. 2 shows a flow diagram for calculating threshold values according to an embodiment of the invention. The DR module 126 exchanges information with the utility 136 and the customer site 104. This information is used to determine the demand response in the demand response process. The process can be initiated automatically or by a utility. In step 202, the number of demand response events or actions is set to 1 as shown by m=1. In step 204, the opportunities remaining for calling a demand response is also set to 1 as shown by n=1. In step 206, it is determined whether the number of opportunities for calling a demand response event is less than or equal to the number of events left. If the answer is yes, then processing continues to step 208, and the decision criteria is set to zero as shown by $D_{mn}$=0 and expected savings are calculated as shown for $V_{mn}$. Processing continues to step 210 where the number of opportunities used for calling a demand response is incremented. If the answer in step 206 is no, then processing continues to step 212, where the decision criteria $D_{mn}$ and the total value expected $V_{mn}$ from available demand response events are calculated. The expected value $V_{mn}$ can be calculated analytically or it can also be calculated using a Monte Carlo simulation or other method. In step 214, the number of opportunities n used for calling a demand response event is incremented. In step 216, it is determined whether the number of opportunities n for calling events is greater than the total number of opportunities available for calling the demand response events, or T. If the answer is yes, then processing continues to step 218, where the number of demand response events is incremented. In step 220, it is determined whether the number of events is greater than the total number of events available. If the answer is yes, then processing ends in step 222. If the answer in either steps 216 or 220 is no, then processing returns to step 206. The output of the process is used to generate a look-up table, such as that shown in Table 1 above, for example, that can be used to optimize the use of demand response events based on the number of events available and the number of opportunities remaining to call an event.

Figure 3:
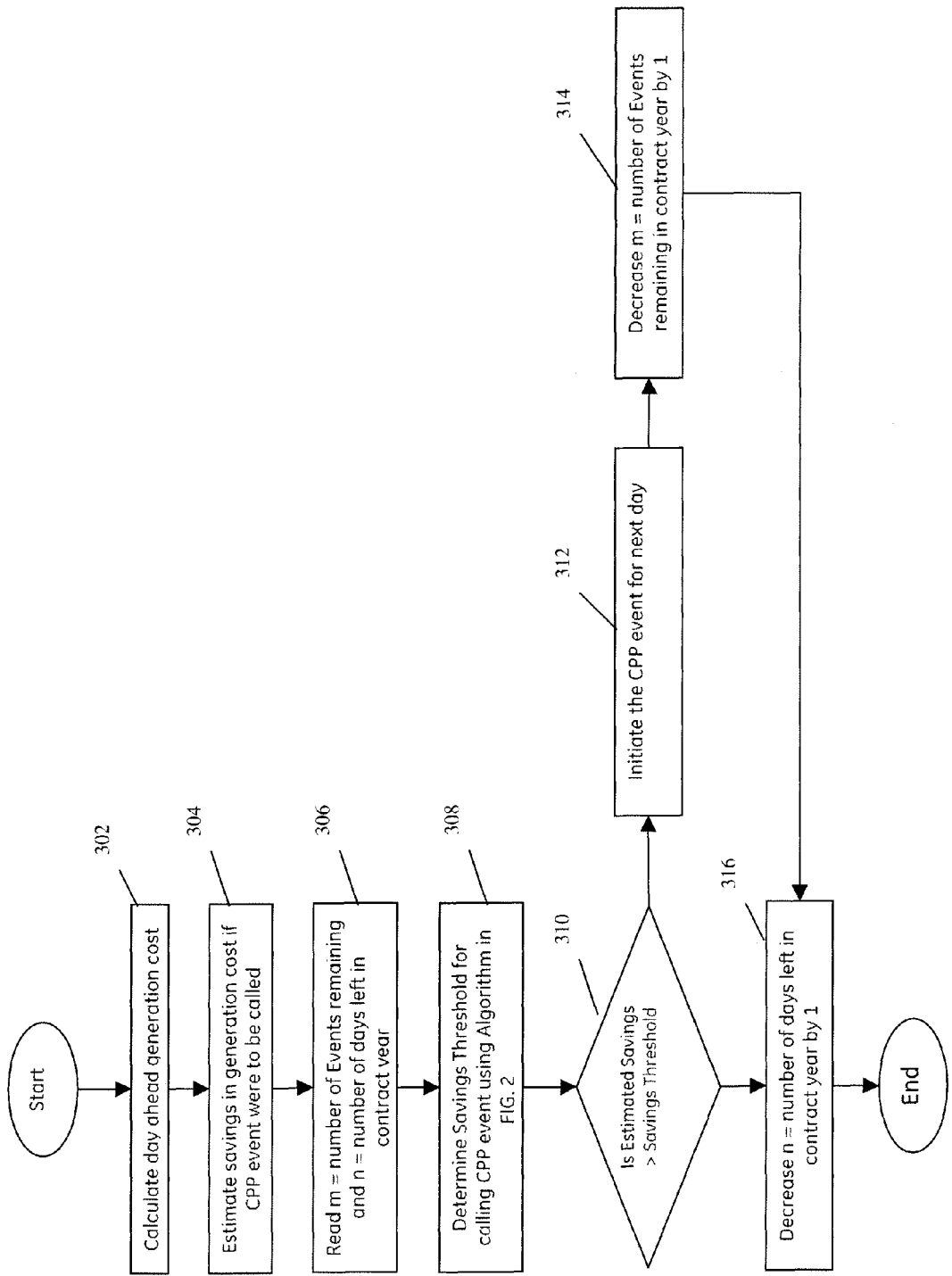
FIG. 3 illustrates a flow diagram of an exemplary demand response event determination according to an embodiment of the invention.

FIG. 3 is a flow diagram showing an example of the process for the criteria of generation cost as a trigger and critical peak pricing (CPP) as the demand response program. According to this embodiment, the process is repeated daily. In step 302, the day ahead generation cost is calculated. In step 304, the savings in generation cost if a CPP event were called is estimated. In step 306, the number of events remaining, m, and the number of days left in the contract, n, are determined. In step 308, the savings threshold for calling a CPP event is determined using the process shown in FIG. 2. In step 310, it is determined whether the estimated savings is greater than the savings threshold. If the answer is yes, then processing continues to step 312 where the CPP event is initiated, and to step 314 where the number of events remaining is decreased. In step 316, the number of days left to call a demand response event is decreased by one. Also, if the answer in step 310 is no, then processing continues to step 316.

In summary explanation, embodiments of the invention provide a trigger criterion that dynamically changes as the number of events and the number of potential opportunities to use those events changes. In other words, the decision criteria reflect the option value of being able to call a demand response or CPP event. The option value is a function of the number of callable events remaining, the number of calling opportunities remaining, and the distribution of the generation cost or any other value parameter for each remaining opportunity. The value parameter (or the trigger measure) can be changed to whatever suits the utility. In this manner, the utility can optimize the use of demand response events.

While embodiments of the invention have been described in the context of critical peak pricing DR programs, it will be appreciated by those skilled in the art that the method and system can be used for other purposes such as responding to contingencies in the power distribution network, and general load control for energy conservation, for example.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system for controlling demand response events in a utility network, comprising:
    customer sites connected to the utility network, wherein each of the customer sites comprises one or more utility consuming devices; and
    a utility management server communicatively coupled to the customer sites and a utility, wherein the utility management server comprises:
        a demand response module including a combination of software and hardware elements for calculating a decision criteria of when to apply load shedding actions for reducing loads at customer sites the demand response module configured to:
        define an expected value of an estimated saving, of the total expected savings, in each time period of a plurality of time periods;
        define the total expected savings by applying a number of the load shedding actions over the plurality of time periods define the decision criteria for a number of opportunities to apply the number of the load shedding actions;
        when the number of the opportunities is less or equal than the number of the load shedding actions:
        apply a load shedding action by directly switching off the loads remotely, of the load shedding actions, in said each time period;
        calculate the total expected savings in said each time period as a sum between the expected value of the estimated saving in said each period and the total expected savings in a preceding period of said each period; and
        when the number of the opportunities is greater than the number of the load shedding actions:
        calculate the total expected savings in said each time period by utilizing a Monte Carlo simulation;
        calculate the decision criteria as the total expected savings in the preceding period when there is only one load shedding action left, from the number of load shedding actions;
        calculate the decision criteria as a difference between the total expected savings of subsequent load shedding actions, of the load shedding actions, at a preceding opportunity of the number of the opportunities, when there is more than the one load shedding action left; and
        apply another load shedding action by directly switching off the loads remotely, of the load shedding actions, when the Monte Carlo calculated total expected savings are greater than the decision criteria.

2. The system of claim 1, further comprising:
    a database coupled to the utility management server for storing demand response event information.

3. The system of claim 1, wherein the decision criteria is utility generation cost.

4. The system of claim 1, wherein the decision criteria is one of temperature, total demand, reserve margin, or market price.

5. The system of claim 1, wherein the decision criteria is updated at each opportunity based on a number of remaining events, conditions of the system for a current opportunity, a number of remaining opportunities, and a forecast for the system's conditions over the remaining opportunities.

* * * * *